United States Patent [19]
Nakamoto

[11] Patent Number: 5,361,348
[45] Date of Patent: Nov. 1, 1994

[54] DEBUG CIRCUIT OF A SIGNAL PROCESSOR

[75] Inventor: Takashi Nakamoto, Tokyo, Japan

[73] Assignee: NEC Corporation, Tokyo, Japan

[21] Appl. No.: 97,311

[22] Filed: Jul. 23, 1993

Related U.S. Application Data

[63] Continuation of Ser. No. 638,639, Jan. 8, 1991, abandoned.

[30] Foreign Application Priority Data

Jan. 8, 1990 [JP] Japan .................................. 2-001884

[51] Int. Cl.5 ...................... G06F 11/34; G06F 11/00; G06F 7/22
[52] U.S. Cl. .................................... 395/575; 371/19; 371/16.2; 364/267.91
[58] Field of Search ................. 371/19, 12, 15.1, 16.1, 371/16.2; 395/575; 364/184, 267.91

[56] References Cited

U.S. PATENT DOCUMENTS

| | | | |
|---|---|---|---|
| 4,308,581 | 12/1981 | Raghunathan | 371/19 |
| 4,881,228 | 11/1989 | Shauda | 371/19 |
| 4,924,382 | 5/1990 | Shauda | 364/200 |
| 5,047,926 | 9/1991 | Kuo et al. | 395/575 |
| 5,053,949 | 10/1991 | Allison et al. | 395/575 |
| 5,084,814 | 1/1992 | Vaglica et al. | 364/232.8 |
| 5,257,269 | 10/1993 | Hamauchi | 371/19 |

Primary Examiner—Robert W. Beausoliel, Jr.
Assistant Examiner—Trinh Tu
Attorney, Agent, or Firm—Whitham, Curtis, Whitham & McGinn

[57] ABSTRACT

A debug program is decoded in a command decoder to generate a debug start signal. Then, a signal processing operation is halted and a state of an internal circuit is latched and read to be supplied to an external circuit. When the reading of the state starts, a signal-processing continuation signal is generated, so that the signal processing operation is restored to be continued. Therefore, the debug program can be inserted to a program memory at plural addresses without braking the signal processing operation.

6 Claims, 4 Drawing Sheets

DEBUG CIRCUIT OF A SIGNAL PROCESSOR

This is a continuation of application Ser. No. 07/638,639 filed Jan. 8, 1991, now abandoned.

FIELD OF THE INVENTION

This invention relates to a debug circuit of a signal processor, and more particularly to, a debug circuit of a signal processor in which debug operation of a program memory is carried out without a brake of program operation.

BACKGROUND OF THE INVENTION

In a conventional debug circuit of a signal processor, a command such as BRAKE is inserted to a program memory at a predetermined address where an inner circuit state is to be traced, so that the processor stops the program operation at an address just before the command of BRAKE, and then the processor supplies an external circuit with information of an internal circuit such as an arithmetic unit to bebug the program.

According to the conventional debug circuit of a signal processor, however, there is a disadvantage in that it is necessary to restart the program operation from the first address after finishing of the debug operation, as a result of conducting the command of BRAKE. Consequently, it is hard to carry out the debug operation at plural addresses of the program memory.

SUMMARY OF THE INVENTION

Accordingly, it is an object of the invention to provide a debug circuit of a signal processor in which a program operation can be continued even after finishing of a debug operation.

According to a feature of the invention, a debug circuit of a signal processor comprises:

a program memory for storing a signal processing program and a debug program;

means for decoding the signal processing program and the debug program to provide commands in a signal processing mode and a debug mode, respectively; and means for transferring a state of an internal circuit to an external circuit;

wherein the debug program is decoded in the decoding means to drive the transferring means providing the debug mode and to halt the signal processing mode, and the signal processing mode is restored to be continued, when the transferring means starts providing the state to the external circuit.

BRIEF DESCRIPTION OF THE DRAWINGS

The invention will be described in more detail in conjunction with appended drawings wherein.

DESCRIPTION OF THE PREFERRED EMBODIMENTS

Figure 1:
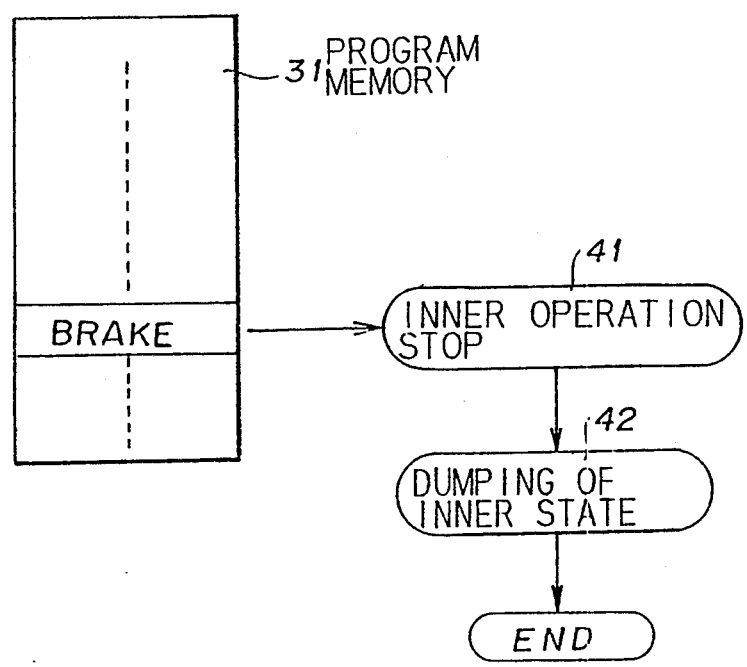
FIG. 1 is an explanatory diagram of a program memory including a flow chart explaining a conventional debug operation.

Before explaining a debug circuit of a signal processor according to the invention, a conventional debug circuit of a signal processor will be explained in FIG. 1.

In the conventional debug circuit of a signal processor, a command of BRAKE is inserted to a program memory 31 at a predetermined address where an inner circuit state is to be traced, so that the processor stops an inner operation at a step 41, and then the processor dumps a state of an inner circuit at a stop 42 for debugging. In this case, the program stops by executing the command of BRAKE, so that the program must be restarted.

Figure 2:
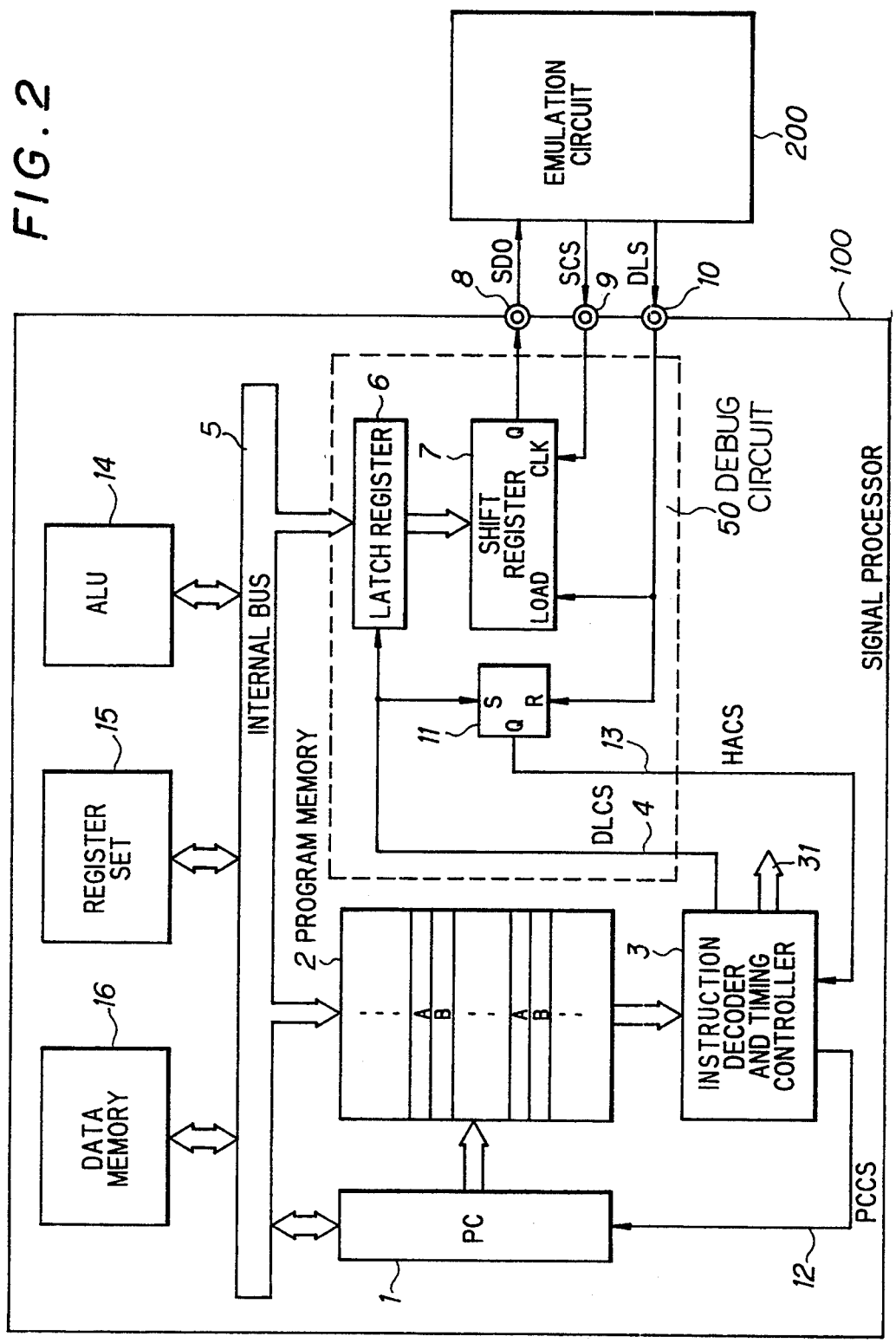
FIG. 2 is a block diagram showing a debug circuit of a signal processor in a first preferred embodiment according to the invention.

Next, FIG. 2 shows a signal processor including a debug circuit in a first preferred embodiment according to the invention.

The signal processor 100, which is fabricated as a semiconductor integrated circuit device, comprises a program memory 2 which stores a program, a program counter (PC) 1 which designates addresses where instructions to be carried out in the program are stored, an arithmetic logical processing unit (ALU) 14, a register set 15 which includes an accumulator and a temporary register, a data memory 16 which stores data temporarily, and a debug circuit 50. These components are connected with each other through an internal bus 5. The signal processor 100 additionally comprises an instruction decoder and timing controller 3 which decodes instructions read from the program memory 2 and produces control signals 31 to control execution of the instructions. The instruction decoder and timing controller 3 receives a signal (HACS) from the debug circuit 50 and generates signals (DLCS, PCCS) (details will be explained later).

The program memory 2 stores a program for signal processing in an ordinary operation mode, however, instructions A and B for checking an internal running state are inserted into addresses in the program where debug operation should be conducted in a debug (program check) mode. Thus, a memory which is enabled to be rewritten is used for the program memory 2. In the first preferred embodiment, a RAM is used as the program memory 2, however, an EPROM may be also used.

The instruction A is an instruction to transfer data to be checked in which an address of an internal resource which stores the data temporarily such as the register set 15 or the data memory 16 is designated as a source address and an address of the debug circuit 50 is designated as a destination address. Any register of the register set 15 or any region in the data memory 16 can be designated by a source address; on the other hand, a latch register 6 in the debug circuit 50 is designated by a destination address. In this case, an ordinary data transfer instruction may be used as the instruction A.

The debug circuit 50 comprises a latch register 6 which latches data, a shift register 7 which supplies an internal state data of the latch register 6 to an external emulation circuit 200, and a S-R flip flop 11. The latch register 6 latches data existing on the internal bus 5 in accordance with a data latch control signal (DLCS) 4 supplied from the instruction decoder and timing controller 3 and supplies the data to the shift register 7. The data latch control signal 4 also plays a role to set the flip flop 11. An output Q of the flip flop 11 is supplied to the instruction decoder and timing controller 3 as HACS 13. A program counter control signal (PCCS) 12 is used for controlling renewal operation of data in the program counter 1.

The shift register 7 is loaded with data supplied from the latch register 6 in response to a data load signal DLS supplied to a load terminal LOAD, and provides shift-out data SDO one bit by one bit in response to a shift clock signal SCS supplied to a clock terminal CLK. These signals SCS and DLS are supplied through the terminals 9 and 10 from the external emulation circuit 200 to the shift register 7. The data load signal DLS is also supplied to the flip-flop circuit 11 to be thereby reset.

Figure 3:
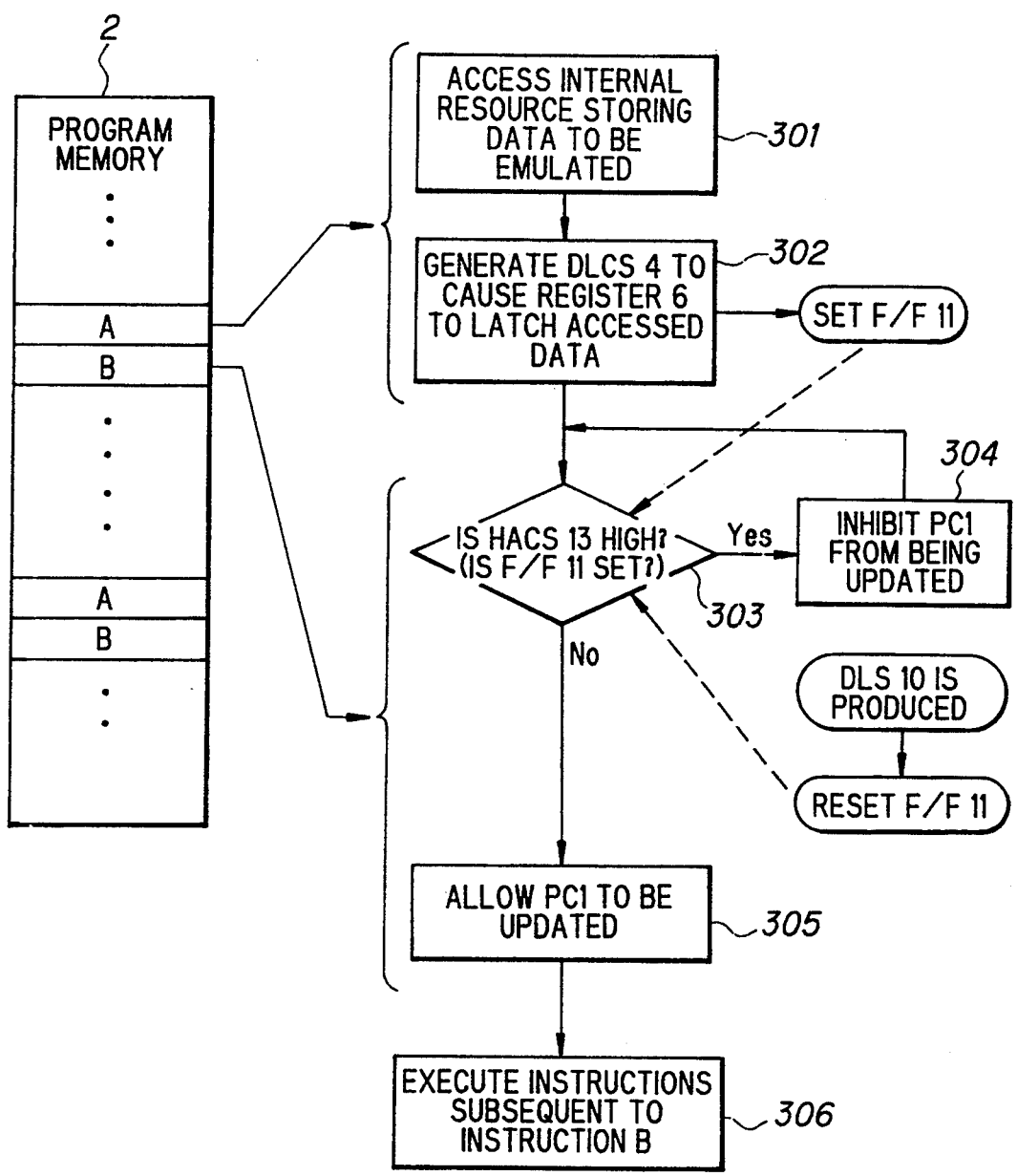
FIG. 3 is a flow chart explaining operation of the debug circuit of a signal processor in the first preferred embodiment according to the invention.

In operation as shown in FIG. 3, a pair of the instructions A and B are inserted into predetermined addresses of a program which is read from the program memory 2 in a predetermined sequence by the address designation of the program counter 1. The instruction decoder and timing controller 3 decodes the read instructions to provide a control signal 31 necessary to execute the instructions. Thus, data processing is carried out, and processed data are temporarily stored in the register set 15 and the data memory 16.

When the instruction A is read from the program memory 2 in advance of the address designation of the program counter 1, the control signal 31 for conducting the step 301 (FIG. 3) is generated. That is, a source address contained in the instruction A is utilized to access an internal resource such as the register set 15 and the data memory 16 for storing data, and provide data read therefrom on the internal bus 5. Next, a data latch control signal 4 is generated at the step 302 (FIG. 3) to latch data of the internal bus 5 into the latch register 6, and to set the flip-flop 11.

When the address designation of the program counter 1 is renewed to read the instruction B from the program memory 2, the instruction decoder and timing controller 3 detects a level of the HACS signal 13 supplied from the Q terminal of the flip-flop 11 at the step 303 (FIG. 3). The HACS signal 13 is at high, because the flip-flop 11 is in a set state. Accordingly, the content of the program counter 1 is prohibited to be counted up by the PCCS signal 12 at the step 304 (FIG. 3). This state continues until the HACS signal 13 is turned to be low, that is, the flip-flop 11 is reset. Thus, the instruction B is a conditioned instruction for controlling the HALT state of the program counter 1 in accordance with the state of the flip-flop 11.

When the DLS signal is generated to emulate the content of data processed in the execution of the program in the emulation circuit 200, data stored to be emulated in the latch register 6 are loaded into the shift register 7. The shift clock signal SCS is generated in the emulation circuit 200, so that the data are supplied from the shift register 7 to the emulation circuit 200, in which the data are emulated.

On the other hand, when the DLS signal is produced, the flip-flop 11 is reset to turn the HACS signal to be low. Accordingly, the instruction decoder and timing controller 3 makes the PCCS signal inactive, so that the program counter 1 is allowed to designate an address at the step 305 (FIG. 3). As a result, an instruction following the instruction B is read from the program memory 2 to be conducted.

In this manner, the program is automatically interrupted by using the pair of the instructions A and B, when data to be emulated are processed, and the interrupted program is continuously conducted, when the data are supplied to the emulation circuit 200. Even if following data are latched into the latch register 6 prior to the complete supply of the data from the shift register 7 to the emulation circuit 200, no problem occurs, because the program is interrupted at the time.

If an external output terminal is provided to supply the HACS signal 13 from the flip-flop 11 to the emulation circuit 200, the emulation circuit 200 is advised of the timing when data to be emulated is latched into the latch register 6. Furthermore, the shift register 7 may be replaced by a parallel register, and the terminal 8 may be replaced a terminal having outputs equal to bit number of the parallel register, so that data are supplied from the parallel register to the emulation circuit 200 at one clock timing.

Figure 4:
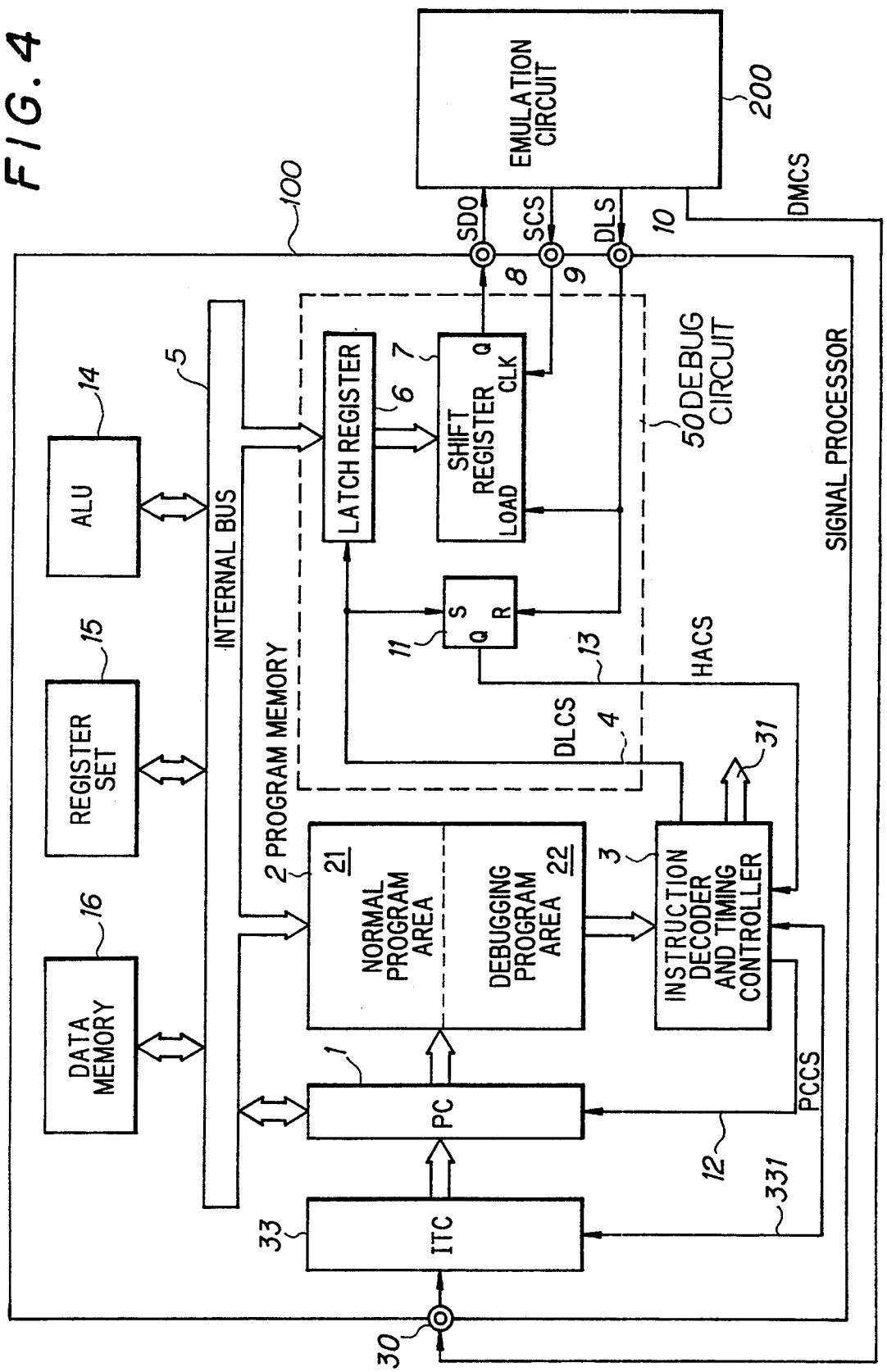
FIG. 4 is a block diagram showing a debug circuit of a signal processor in a second preferred embodiment according to the invention.

FIG. 4 shows a signal processor in another preferred embodiment according to the invention, wherein like parts are indicated by like reference numbers. In this preferred embodiment, the program memory 2 is divided into a first regions 21 for storing an ordinary program and a second region 22 for storing a debug program including instructions for debug operation and pair of the aforementioned instructions A and B. In addition, an interrupt controller (ITC) 33 is provided to receive a debug mode signal DMCS through a terminal 30 from the emulation circuit 200.

When the DMCS signal is inactive, the program counter 1 designates the ordinary program region 21 to conduct the ordinary program. When the emulation circuit 200 makes the DMCS signal active to emulate data, the ITC 33 adivses the instruction decoder and timing controller 3 of the mode to be conducted by use of a control signal bus 331. In response, the program processing is temporarily interrupted, and the contents of the program counter 1 and the register set 15 are transferred into a stack region of the data memory 16. Then, address information for the debug program region 22 is stored in the program counter as vector information from the ITC 33, so that debug processing is carried out. In this processing, the aforementioned operation is carried out, when the instructions A and B are read from the region 22. When the debug operation is finished, the data transferred into the data memory 16 are restored into the program counter 1 and the register set 15, and the ordinary program is continued to operate.

Although the invention has been described with respect to specific embodiment for complete and clear disclosure, the appended claims are not to thus limited and alternative constructions that may occur to one skilled in the art which fairly fall within the basic teaching herein set forth.

What is claimed is:
1. A debug circuit of a signal processor, comprising:
a program memory for storing a signal processing program and a debug program;
means for decoding said signal processing program and said debug program to provide commands in a signal processing mode and a debug mode, respectively;
means for transferring a program running state of an internal circuit of said signal processor to an external circuit, said transferring means receiving a data load signal and a clock signal from said external circuit to control a speed of transferring said program running state;
wherein said debug program is decoded in said decoding means to drive said transferring means, providing said debug mode, and to halt said signal processing mode, and said signal processing mode is resumed in response to said data load signal, when said transferring means starts providing said program running state to said external circuit.

2. A debug circuit of a signal processor, according to claim 1, wherein:
said decoding means controls a program counter to halt operation for generating an address signal for said signal processing program, when said debug program is decoded.

3. A debug circuit of a signal processor, according to claim 1, wherein said transferring means includes:
a latch register for latching said state supplied through an internal data bus from said internal circuit, when said debug program is decoded;
a shift register for providing said state supplied from said latch register to said external circuit by receiving an externally supplied reading signal; and
a flip-flop for providing a first control signal to said decoding means, so that said signal processing mode is halted to start said debug mode, and a second control signal to said decoding means, so that said signal processing mode is restored to be continued by stopping said debug mode.

4. A debug circuit for a signal processor, comprising:
a latch register for latching data to be supplied from said signal processor through an inner bus line thereof to an external circuit in accordance with a data latch signal;
a shift register for latching said data in said latch register in accordance with a data load signal from an external circuit and outputting said data;
a flip-flop which is set by said data latch signal and is reset by said data load signal;
a program counter for generating an address signal;
a program memory for storing program data and debug command data, said program memory being responsive to said address signal for reading out program data or debug command data;
a command decoder means for decoding said debug command data read from said program memory for generating said data latch signal in response to data debug command;
means responsive to an output state of said flip-flop for controlling output of said command decoder means ;
whereby a program running state is supplied through said shift register to an external circuit in response to said debug command data, and an ordinary program operation is resumed while said shift register outputs said data latched in said shift register.

5. A debug circuit of a signal processor according to claim 4:
wherein said program memory includes a first memory for storing said program data and a second memory for storing said debug command data; and wherein
said program counter is connected to receive an input from an interrupt control circuit in response to a debug control signal supplied to said interrupt control circuit and wherein said program counter is controlled to operate in one of an ordinary program operation and an debug mode.

6. A debug circuit of a signal processor, comprising:
a memory for storing a series of instructions to be conducted in program operation;
means for decoding said instructions read from said memory to generate control signals for conduct of said instructions;
a register for latching data supplied in response to a predetermined control signal in said control signals;
means for supplying data latched in said register to an exterior in response to an external read instruction signal;
a flip-flop for taking a first state in response to said predetermined control signal, and a second state in response to said external read instruction signal; and
means for interrupting conduct of said instructions, when said flip-flop is in said first state, and continuing said conduct of said instructions, when said flip-flop is in said second state.

* * * * *